Patented Jan. 16, 1923.

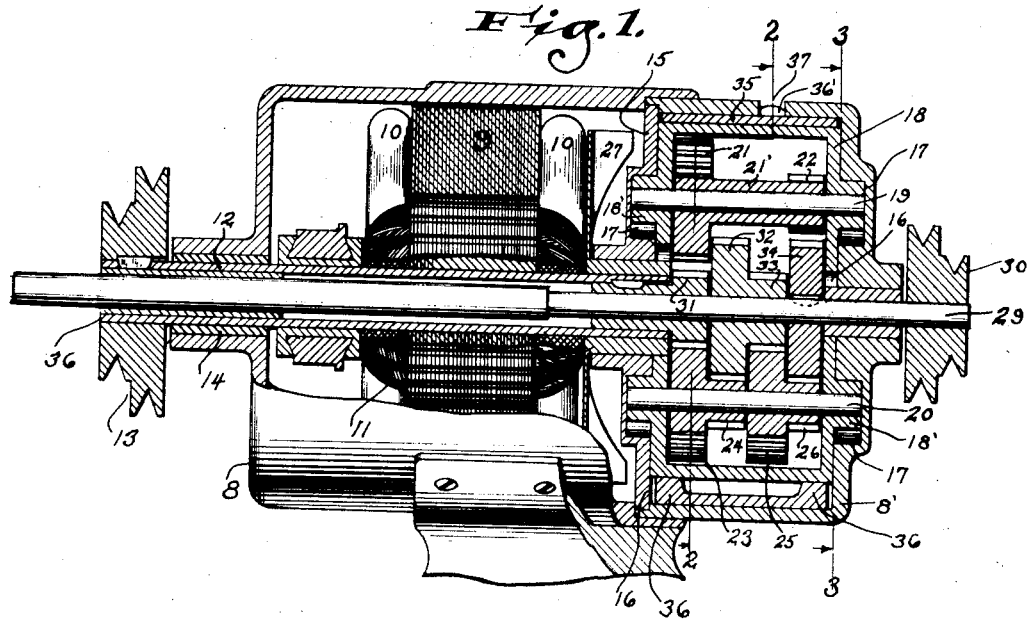
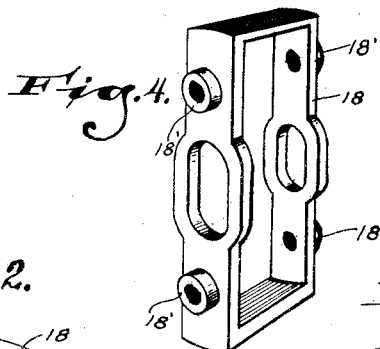
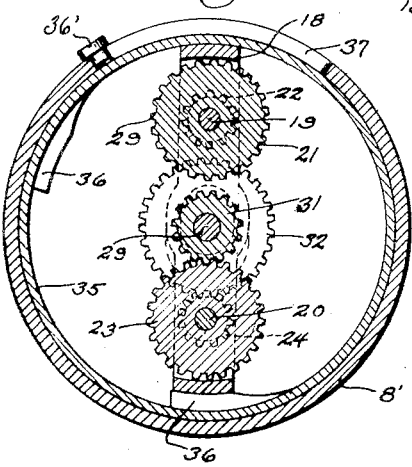
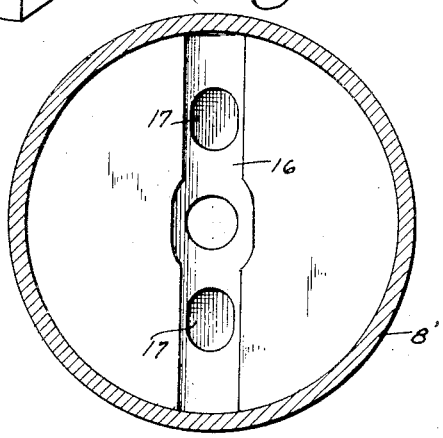

1,442,217

UNITED STATES PATENT OFFICE.

CHARLES W. H'DOUBLER, OF RACINE, WISCONSIN.

MOTOR TRANSMISSION.

Application filed November 18, 1920. Serial No. 424,935.

*To all whom it may concern:*

Be it known that I, CHARLES W. H'DOU-BLER, a citizen of the United States, and resident of Racine, in the county of Racine and State of Wisconsin, have invented new and useful Improvements in Motor Transmissions, of which the following is a description, reference being had to the accompanying drawings, which are a part of this specification.

This invention relates to improvements in motor transmissions, more particularly adapted for small electric motors.

The armatures of small electric motors rotate at comparatively high speed and in order to efficiently use the motors, it is necessary to materially reduce the speed by mechanism which will occupy but a minimum amount of space.

It is one of the objects of the present invention to provide a construction which will accomplish the before mentioned results in a very simple and efficient manner.

A further object of the invention is to provide a motor transmission mounted within the motor casing and enclosed therein in a very simple manner.

A further object of the invention is to provide a motor transmission arranged to transmit motion either at armature speed, or at a speed considerable less than armature speed or at an intermediate speed.

A further object of the invention is to provide a motor transmission in which the armature shaft extends through the sleeve of the working parts and rotates in the same direction as said sleeve.

A further object of the invention is to provide a motor transmission in which means are provided for easily changing the speed of the transmission.

A further object of the invention is to provide a motor transmission in which the armature shaft is of tubular construction and the transmission shaft extends therethrough.

A further object of the invention is to provide a motor transmission which is of simple construction, is strong and durable and is well adapted for the purpose described.

With the above and other objects in view, the invention consists of the improved motor transmission and its parts and combinations as set forth in the claims and all equivalents thereof.

In the accompanying drawings in which the same reference characters indicate the same parts in all of the views:

Fig. 1 is a side view, partly in section, of an electric motor provided with the improved transmission;

Fig. 2 is a transverse sectional view thereof taken on line 2—2 of Fig. 1;

Fig. 3 is a similar view taken on line 3—3 of Fig. 1; and

Fig. 4 is a perspective view of the bearing member for holding the gear shaft.

Referring to the drawing, the numeral 8 indicates a motor casing of cylindrical form in cross section which encloses the field magnets 9 and their windings or coils 10 and the armature 11. Said armature 11 is mounted on a tubular shaft 12 which extends through one end of the casing 8 and is provided with a stepped pulley 13. The said shaft 12 is journaled in the end bearing 14 forming part of said casing. An extension casing 8' is recessed into one end portion of the casing 8 and is provided with an inner partition 15 through which the tubular shaft extends. The inner sides of the extension casing and the partition are formed with vertical recesses or grooved ways 16 and bearing recesses 17 for receiving the rectangular bearing frame 18 slidably adjustably mounted therein. Said frame is provided with projecting bearing portions 18' which slidably extend into the bearing recesses 17. Said bearing portions 18' have mounted therein short stud shafts 19 and 20 which extend from the bearings on one end of the frame to the bearings on the other end of the frame. The upper shaft 19 has a gear 21 and a pinion 22 journaled thereon which are connected together by a long hub or sleeve portion 21'. The lower shaft 20 has journaled thereon a gear 23 provided with an integral pinion 24 and a gear 25 provided with an integral pinion 26.

The opposite end portion of the tubular shaft 12 extends into the hub portion of a fan 27 and said hub portion is journaled in the inner end or partition 15 of the extension casing 8'.

A drive shaft 29 journaled at one end in the tubular shaft 12 at one end extends through and is journaled at its other end in the extension casing 8'. A stepped pulley 30 is mounted on the outer end of said shaft. The driving shaft 29 has journaled thereon a pinion 31 which extends into the inner end portion of the tubular shaft 12 and is keyed thereto. This pinion is adapted to mesh with either the gear 21 or the gear 23 depending upon the position of the bearing frame 18. An integral gear 32 and a pinion 33 are journaled on the shaft 29 and are adapted to mesh respectively with the pinion 24 and the gear 25 when the speed of reduction is the greatest. A gear 34 keyed on the driving shaft 29 meshes with either the pinion 22 or the pinion 26.

A cam ring 35 positioned within the extension casing 8' and surrounding the bearing frame 18 is provided on its inner side with two cam portions 36 which are positioned to separately engage the upper or lower end portions of the bearing frame 18 to move said frame to engage the gears and pinions on either short stud shaft 19 or 20 with the pinions and gears on the drive shaft 29.

A button 36' projecting outwardly from the cam ring 35 and through an elongated slot 37 formed in the upper portion of the extension casing provides for the convenient adjustment of the cam ring to change the speed of the transmission. The shaft 29 projects outwardly through the tubular shaft a sufficient distance to permit a pulley (not shown) being mounted thereon if desired.

In operation, if it is desired to transmit motion at motor speed, the pulley 13 is used and if this speed is too fast for the work, the cam member 35 is turned to move the gear 21 and the pinion 22 into mesh with the pinion 31 and the gear 34, and the pulley 30 is then used to transmit motion. As thus adjusted, motion will be transmitted from the tubular armature shaft 12 and the connected pinion 31 to the gear 21 and the pinion 22 and from said pinion 22 to the gear 34 and the shaft 29 to the pulley 30. To still further reduce the speed, the cam member is turned to mesh the pinion 31 with the gear 23 and the pinion 24 with the gear 32, and the pinion 33 with the gear 25, and the pinion 26 with the gear 34 and to the shaft 29 and the pulley 30.

It is to be understood that the relative size of the gears and pinions may be transposed to increase the speed of the outer rotary member above the armature speed for high speed grinding or other purposes where high speed is essential.

From the foregoing description, it will be seen that the motor transmission is of very simple construction and is very compact and easily operated and that the gears journaled on the drive shaft rotate in the same direction as the shaft.

What I claim as my invention is:

1. A motor transmission, comprising a motor having an armature shaft provided with a pinion, a supplemental shaft adjacent to and parallel with the armature shaft, a gear wheel journaled on the supplemental shaft and meshing with the pinion, another pinion connected to the gear wheel, a gear wheel concentric with the armature shaft and in mesh with the supplemental shaft pinion, a second pinion mounted on the armature shaft, and means connected to the supplemental shaft and concentric with the said supplemental shaft for transmitting motion from said second pinion.

2. A motor transmission, comprising a motor having an armature provided with a tubular shaft, a drive shaft adjacent the tubular shaft, a supplemental shaft positioned adjacent the drive shaft, a pinion surrounding the drive shaft and connected to the tubular shaft, a gear wheel on the supplemental shaft and in mesh with the pinion, a pinion on the supplemental shaft and connected to the gear wheel, a gear wheel journaled on the drive shaft and in mesh with the supplemental shaft pinion, a pinion journaled on the drive shaft, a gear wheel on the supplemental shaft and in mesh with the drive shaft pinion, a second pinion on the supplemental shaft and connected to the last mentioned gear wheel, a gear wheel mounted fast on the drive shaft and in mesh with the second pinion, and driven members mounted on the outer end portions of the drive shaft and the tubular shaft.

3. A motor transmission, comprising a motor having a tubular armature shaft, a drive shaft extending through the tubular shaft, stud shafts adjacent the drive shaft, a pinion connected to the tubular shaft, other sets of gear wheels and pinions journaled on the drive shaft and the stud shafts, a gear wheel fast on the drive shaft, a driven wheel mounted on the outer end portion of the drive shaft, and means for moving the stud shafts closer to or farther from the drive shaft to engage or disengage the sets of gears and pinions carried by the stud shafts with the sets of gears and pinions of the drive shaft to change the rate of speed transmission from the motor.

4. A motor transmission, comprising a motor having a tubular armature shaft, a drive shaft extending through the tubular shaft and having a gear wheel fast thereon, stud shafts adjacent the drive shaft, a pinion connected to the tubular shaft, a gear wheel journaled on one of the stud shafts and in mesh with the pinion, a pinion journaled on the same stud shaft and connected to the gear wheel and in mesh with the drive shaft gear, a gear wheel and a connected pinion journaled on the drive shaft, a gear wheel and a connected pinion journaled on the second stud shaft, a second gear wheel and a connected pinion journaled on the second stud shaft, means for moving the stud shafts closer to or farther from the drive shaft to engage or disengage the gears and pinions of either stud shaft with the gears and pinions of the drive shaft and the tubular shaft, and driven wheels mounted on the outer end portions of the drive and tubular shafts.

5. A motor transmission, comprising a motor having a tubular armature shaft, a casing enclosing the motor and having an inner partition to form a transmission chamber, a movable bearing frame positioned within the transmission chamber, a drive shaft extending through the tubular shaft and the casing and having a gear wheel fast thereon, stud shafts mounted in the bearing frame, a pinion connected to the tubular shaft, a gear wheel and connected pinion journaled on the drive shaft, a gear wheel and connected pinion journaled on one of the stud shafts, a gear wheel and a connected pinion journaled on the second stud shaft, a second gear wheel and a connected pinion journaled on the second shaft, means for moving the bearing frame to mesh the gears and pinions of either stud shaft with the gears and pinions of the tubular shaft and the drive shaft, and driven wheels mounted on the outer end portions of the drive and tubular shafts.

6. A motor transmission, comprising a motor having a tubular armature shaft, a casing enclosing the motor and having an inner partition to form a transmission chamber, a movable bearing frame positioned within the transmission chamber, a drive shaft extending through the tubular shaft and the casing and having a gear wheel fast thereon, stud shafts mounted in the bearing frame, a pinion connected to the tubular shaft, a gear wheel and connected pinion journaled on the drive shaft, a gear wheel and connected pinion journaled on one of the stud shafts, a gear wheel and a connected pinion journaled on the second stud shaft, a second gear wheel and a connected pinion journaled on the second shaft, a revoluble cam, means for moving the bearing frame to mesh the gears and pinions of either stud shaft with the gears and pinions of the tubular shaft and the drive shaft, and driven wheels mounted on the outer end portions of the drive and tubular shafts.

7. A motor transmission, comprising a motor having a tubular armature shaft, a casing enclosing the motor and having an inner partition to form a transmission chamber, the inner portions of the walls of said chamber having grooved ways, a bearing frame slidably mounted in said grooved ways, a drive shaft extending through the tubular shaft and the casing and having a gear wheel fast thereon in the transmission chamber, stud shafts mounted in the bearing frame on opposite sides of the drive shaft, a pinion surrounding the drive shaft and fast to the tubular shaft, a gear wheel and connected pinion journaled on the drive shaft, a gear wheel and connected pinion journaled on one of the stud shafts, a gear wheel and a connected pinion journaled on the second stud shaft, a second gear wheel and connected pinion journaled on the second shaft, a cam ring positioned in the transmission chamber and surrounding and having cam faces engageable with the bearing member to mesh the gears and pinions of either stud shaft with the gears and pinions of the tubular shaft and the drive shaft, and driven wheels mounted on the outer end portions of the drive and tubular shafts.

In testimony whereof, I affix my signature.

CHARLES W. H'DOUBLER.